Oct. 3, 1967  D. ROSS  3,345,304
NEUTRALIZATION PROCESS AND APPARATUS
Filed Nov. 15, 1963
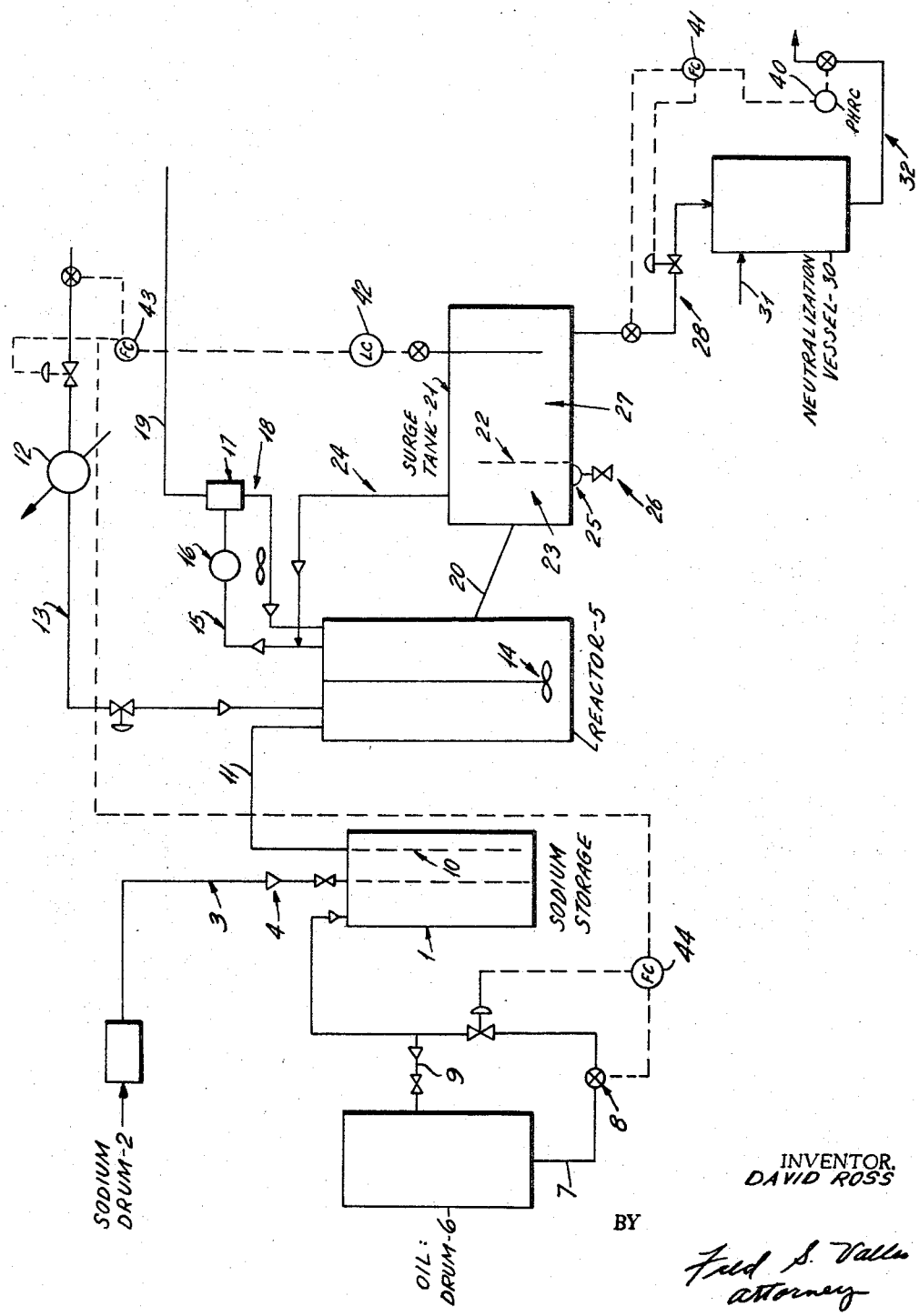
INVENTOR.
DAVID ROSS
BY
Fred S. Vallee
attorney United States Patent Office 3,345,304
Patented Oct. 3, 1967

3,345,304
NEUTRALIZATION PROCESS AND APPARATUS
David Ross, Los Angeles, Calif., assignor to Rexall Drug and Chemical Company, Los Angeles, Calif., a corporation of Delaware
Filed Nov. 15, 1963, Ser. No. 323,930
9 Claims. (Cl. 252—193)

This invention relates to a novel neutralization process for alpha-olefin polymer deashing liquids and to a process for preparing the neutralization compositions. The invention also pertains to certain novel control techniques for utilizing the compositions of this invention to neutralize deashing mixtures containing acidic impurities.

In various processes for the synthesis of polymers or copolymers from ethylene, propylene and higher alpha-olefin compounds, the crude polymeric reaction product contains residual catalyst particles, acidic substances, etc. which are substantially removed from the polymer by a so-called "deashing" operation. A number of deashing methods have been disclosed in the art for effecting the removal of these impurities from the solid polymeric product. Reactants frequently described as useful for deashing of alpha-olefin polymerization reaction products are alcohols such as isopropanol or generally hydroxyl-containing compounds. By utilizing such reactants, it was found that polymerization was terminated and catalyst residues were converted to inactive, soluble forms, which could be readily separated from the polymer product. In some instances, it was found helpful to have an acidic aid, such as hydrochloric acid, present in the alcohol or hydroxyl-containing compound in order to enhance deashing efficiency. It has also been previously proposed to utilize a hydrocarbon compound in conjunction with the hydroxyl-containing reactant to facilitate the removal of undesirable catalyst residues. In accordance with prior art disclosures, the purified, solid polymeric product was separated from the deashing liquids which contained acidic as well as catalyst residues and these were thereafter treated to recover the deashing liquids for reuse in the process.

The recovery of deashing agents for reuse in the process as disclosed heretofore has presented a number of difficulties. The presence of acidic substances, some of which result from the addition of inorganic acids to the deashing agents, as well as from the reaction between the organo metal compounds and the hydroxyl-containing compound, requires special handling procedures and acid-resistant equipment to be used in the purification and recovery of the deashing agents. Although there have been proposals to neutralize the contaminated deashing liquids immediately following removal of the purified, solid polymers, this has also caused some problems. For one thing, a number of known neutralization compounds are not compatible with the diluents used in the polymerization and, consequently, pose certain extraneous problems of recovery and purification. Other neutralizing agents appear to decompose into or to form undesirable by-products. Thus, some are found to form by-product water, which is highly undesirable, since the presence of water in the deashing liquid requires further expensive purification steps.

One object of the present invention is to provide a novel neutralization composition which can be effectively employed to neutralize deashing liquids containing acidic contaminants.

Another object of the present invention is to provide a process for preparing the novel neutralization composition.

A further object of the present invention is to provide apparatus and a method whereby the novel neutralization composition is utilized to neutralize a contaminated deashing liquid recovered from the deashing of an alpha-olefin polymerization reaction product mixture, while avoiding the difficulties encountered in prior art neutralization procedures.

These and other objects will become readily apparent from the ensuing description of the present invention.

In accordance with the present invention, it has now been found that an outstanding neutralization composition comprises an alkali metal isopropylate, isopropanol and a hydrocarbon in certain concentrations as will be set forth hereinafter. Although potassium and lithium isopropylates can be employed, sodium isopropylate is preferred. Further, in accordance with this invention a method is provided herein for preparing the neutralizing compositions for use herein and apparatus and a technique for controlling the various flows of neutralizing components and compositions to contact deashing liquid in a manner set forth illustratively in the accompanying drawing which forms a part of this invention and specification. The preferred neutralization compositions herein comprise minor proportions of an alkali metal alkoxide and major proportions of a mixture of alcohol and low molecular weight hydrocarbon.

The preferred neutralization composition will generally comprise about 2 to 10% by weight of the alkali metal isopropylate, about 30 to 70% by weight of the isopropanol and about 70 to 30% by weight of the hydrocarbon, the alcohol and hydrocarbon percentages being on a salt-free basis. Specific neutralizing compositions will contain about 4 to 6% by weight of the alkali metal isopropylate, about 45 to 55% by weight of the isopropanol and about 55 to 45% by weight of the hydrocarbon on a salt-free basis. It will be understood, however, that higher concentrations of sodium isopropylate can be employed at elevated temperatures. Thus, at about 40° C., about 7.2% of the sodium isopropylate will be soluble in the neutralizing composition, whereas at 22° C., about 4.3% is soluble. At temperatures higher than 40° C., the solubility of the sodium isopropylate increases.

The following terms where used in this specification and in the appended claims are intended to have the meaning indicated: (a) "Deashing" liquid or agent or mixture means a liquid which can be an azeotrope or compositions approaching an azeotrope composed of a hydrocarbon and an alcohol and includes, unless otherwise noted, small amounts of an inorganic acid. This liquid is used to contact an alpha-olefin polymer slurry or wet cake to deactivate and solubilize catalyst residues. The liquid becomes contaminated usually with the solubilized catalyst residues, inorganic acid residues and in certain instances with small amounts of low molecular weight or atactic polymer. It is this deashing liquid which is neutralized and purified by the compositions and process of this invention. (b) "Diluent" is intended to mean the liquid used as a dispersant during the polymerization reaction, whether it be an added hydrocarbon or the monomer per se in liquid form or mixtures of these. (c) "Neutralizing" composition or liquid or mixture means the liquid (including hydrocarbon, alcohol and alkali metal-alkanol) used to neutralize the acidic residues of the contaminated deashing liquid as will be set forth more clearly hereinbelow.

The preferred deashing liquids for use in the process of this invention are hydrocarbon-alcohol mixtures which are preferably soluble one within the other. Exemplary hydrocarbons are aliphatic alkanes having from about 4 to 10 carbon atoms such as butane, pentane, hexane, heptane, octane, nonane, decane and the like. Aromatic hydrocarbons also are included since they form constant boiling compositions with certain alcohols. Thus, toluene, xylene, p-diisopropyl benzene and p-cymene form azeotropes with propanol and isobutanol, etc.

The alcohols useful for forming the deashing liquids in combination with the hydrocarbons above include those having from 1 to 10, preferably 1 to 8, carbon atoms such as methanol, ethanol, propanol, isopropanol, the butanols, pentanols, hexanols, octanols, etc. Related alkoxy alkanols or dihydric alcohols, etc. can also be used.

As indicated above, the hydrocarbon-alcohol deashing liquid should preferably comprise a mixture which is mutually soluble and which is capable of forming a constant boiling composition, that is, an azeotrope which, depending on the composition, will have a boiling point of from, for example, 65° C. to about 140° C., but preferably from about 70° to about 110° C. An exact azeotrope is not required as the deashing liquid since it has been found that those compositions approaching an azeotrope are efficient deashing liquids. Thus, while the heptane-isopropanol azeotrope consists of about a 50:50 mixture boiling around 76 to 77° C., a mixture of from 30:70 to 70:30 of heptane-isopropanol can be efficiently employed as the deashing liquid in accordance with the process herein. The deashing liquid can also contain from 0.1 to 1 percent or higher of a mineral acid such as hydrochloric acid which aids in the deashing operation.

In accordance with one of the preferred methods of carrying out the neutralization method of this invention, the neutralization composition will contain the same hydrocarbon and alcohol component present in the deashing liquid. Thus, for example, if the deashing liquid contains heptane and isopropanol, the neutralization composition will also contain heptane and an alcohol-alkali metal compound. It will be understood, however, that a hydrocarbon can be employed in the neutralization composition which is different than the hydrocarbon or hydrocarbons present in the deashing liquid. Also, where a hydrocarbon diluent is used in the polymerization, this can also be used at least in part to form the hydrocarbon-alcohol deashing liquid. The present invention also contemplates the use of a neutralization composition containing an admixture of hydrocarbons in conjunction with the alkali metal isopropylate and the isopropanol. The latter conditions can be effectively utilized, of course, only when no compatibility problem arises.

The process of this invention includes the use of an alcohol alone or in conjunction with a hydrocarbon as the deashing liquid. The use of isopropanol and a hydrocarbon is preferred. It follows that, when utilizing this aspect of the invention, isopropanol will be employed in the neutralization composition. Where the hydrocarbon component of the deashing liquid and the neutralizing composition are the same, as is preferred herein, the only additional material required to effect neutralization of the deashing fluid will be the sodium isopropylate. A number of advantages follow from such a method of operation. To begin with, no additional recovery and recycling steps need be employed. Secondary, no problem of compatibility is encountered in the neutralization step. Furthermore, the absence of any special substances for formulating the neutralization composition avoids storage, recovery, recycling, etc. problems.

Since the presence of water in the neutralization composition would result in the introduction of this undesirable material into the mixture, it is preferred to employ substantially anhydrous compounds in formulating the neutralization composition. It is preferred, for example, to dry the isopropanol and heptane, when these materials are employed, prior to their use in preparing the neutralization composition to less than about 100, preferably less than about 50 p.p.m. water.

The substitution of, for example, sodium hydroxide, in place of the sodium isopropylate results in substantial amounts of water formed as a neutralization by-product. The presence of such water requires the use of expensive driers. In contrast, less than 50 p.p.m. of water is present in recycle streams when sodium isopropylate is used in accordance with the process of this invention.

The neutralization composition can be effectively used to neutralize the contaminated deashing liquid after the latter has been separated from the purified or deashed polymer merely by addition thereto with agitation. The resulting neutralized, contaminated mixture can then be subjected to known processing steps to separate the contaminants and unreacted alkali metal isopropylate, if any, from the liquids. Because of the neutralized condition of these liquids, conventional carbon steel equipment can be employed for this purpose. The purified liquids which are essentially of the same composition as the deashing liquid can then be recycled directly to the deashing step. If the neutralization composition contains the same hydrocarbon and alcohol as the deashing liquid, a portion of the recovered liquids can be recycled to the step wherein the neutralization composition is prepared, as more specifically described hereinafter. The versatility of this technique can be readily appreciated.

In general, the amount of neutralization composition added to the deashing liquid need only be sufficient to effect neutralization of the acidic contaminants. More specifically, the amount of neutralization composition employed will range from about 0.1 to 5.0% by weight, and preferably about 0.1 to 3.0% by weight, based on the total weight of the contaminated deashing liquid. It will be understood, however, that the actual amount of neutralization composition used can vary over a wide range and that the use of excess amounts are also contemplated. In the preferred embodiment of this invention, it is desirable to obtain a treated mixture having a pH within the range of about 7 to 9. At this pH range, complete neutralization of the acidic residues in the deashing liquid is obtained.

A variety of contaminated polymeric materials may be subjected to the above described deashing treatment. The polymeric materials may be polymers, block copolymers or random copolymers prepared, for example, from such alpha-olefins as ethylene, propylene, butene-1 and in general, alpha-olefins of from 2 to 10 carbon atoms and including branched alpha-olefins such as 4-methylpentene-1 and the like. The metallic or catalyst residues present in such polymeric products are derived from organometallic polymerization catalysts. In commercial production, these catalysts generally have been prepared from metal reducing compounds such as alkyl aluminum compounds like triethyl aluminum, diethylaluminum monochloride, triisobutyl aluminum, trioctyl aluminum, etc. with a titanium, vanadium or zirconium compound such as the tetrahalide and especially the tetrachloride and trichloride compounds (Natta-Ziegler catalysts). Obviously, the exact nature of the organo-metallic catalyst employed during polymerization or the nature and percentage of the catalyst residues in the polymeric product are not critical features of the present invention, since these can vary from product to product or process to process.

For purposes of convenience only, the present invention, as well as certain specific features thereof will be described in detail hereinafter with respect to polypropylene. The following will serve to illustrate further the neutralization method of this invention.

*Example 1*

Polypropylene polymer prepared from the reaction of propylene with a titanium chloride and aluminum alkyl catalyst is slurried in a deashing liquid consisting of a composition of about 45% heptane and 55% isopropanol. Anhydrous hydrochloric acid is added to a concentration of 0.1% based on total deashing liquid. After the appropriate residence time and contact, the polymer, essentially free of catalyst residues, is separated from the now contaminated deashing liquid which is pumped to a neutralization vessel. The deashing liquid contains 0.1% hydrochloric acid, 0.06% catalyst residues, and a variable amount of soluble polymer which is dependent upon reactor conditions. The polymer does not affect the neutralization reaction. The temperature in the neutralization vessel is maintained at 150° F. and the vessel is essentially at atmospheric pressure. The vessel is agitated to ensure thorough mixing of the deashing liquid and added sodium isopropylate-hydrocarbon-alcohol mixture. The pH of the effluent from the neutralization tank is measured and maintained at pH 7–9 by controlling the flow of incoming sodium isopropylate-hydrocarbon-alcohol mixture. Average flow of total neutralization liquid amounts to 3% wt. of the flow of deashing liquid. The neutralization composition contains 5% wt. of sodium isopropylate and is essentially 45% heptane and 55% isopropanol. The salts formed upon neutralization consist of titanium and aluminum isopropylates and sodium chloride. There is no water formed during neutralization, the total water concentration in the composition remaining below 50 p.p.m. The neutralized composition is subsequently treated to remove the residues. The small amount of isopropanol consumed in forming neutralization salts is periodically made up to maintain the proper concentration.

The above example demonstrates that the neutralization compositions can be effectively utilized to treat contaminated deashing liquids obtained from the deashing of polymeric materials. The compatibility of the neutralization composition with the contaminated deashing liquid and the substantial absence of water in the resulting neutralized solvent mixture has also been shown.

Another feature of the present invention resides in a process for preparation of the neutralization composition. In general, the process comprises reacting an alkali metal such as sodium with an excess of alcohol to form the corresponding alkoxide in solution. The reaction is carried out under an inert atmosphere, e.g. nitrogen, with agitation at a temperature which is at least above the melting point of the alkali metal (for sodium, the M.P. is 97.5° C. or about 207.5° F.). Hydrogen is evolved as a by-product of the reaction and can either be recovered or vented to a flare. The exothermic nature of the reaction aids in maintaining the reaction temperature above the melting point of the alkali metal.

In addition to the alcohol, an inert hydrocarbon is, in accordance with the preferred method of practicing the invention, added to the reaction zone usually in admixture with the alcohol. For reasons previously given, it is also desirable to maintain the hydrocarbon and the alcohol substantially free of water prior to reaction with the alkali metal.

The preferred reactants for preparing the neutralization composition of this invention are sodium as the alkali metal, isopropanol as the alcohol and either n-heptane or n-hexane as the hydrocarbon constituent. The latter choice will depend upon the hydrocarbon present in the deashing liquid to be treated by the neutralization composition, since it is preferred to have both hydrocarbons the same or compatible, with the use of the same hydrocarbon actually being preferred.

In general, it is also preferred to have the neutralization composition thus produced contain approximately the same proportions of the alcohol and the hydrocarbon as used for formulating the deashing liquid since upon cleanup of the neutralized mixtures, the clean (salt and polymer free) liquids can be used again for deashing and/or for preparation of more neutralization compositions.

For a more complete understanding of this aspect of the invention, reference will now be made to the figure, which schematically shows apparatus and the process for preparing the novel neutralization composition of this invention. However, it will readily be apparent that this particular embodiment may be varied widely without departing from the basic nature of the inventive process.

With particular reference to the drawing, sodium is charged to sodium storage tank 1 from sodium drum 2 via line 3. The drum 2 is provided with electrical heaters (not shown) to melt the sodium, which is either pumped or passed by gravity flow under a nitrogen atmosphere to sodium storage tank 1. An interlock system is provided in line 3 to prevent overpressuring the sodium drums. Thus, the indicated valve 4 on line 3 cannot be opened until essentially atmospheric pressure is obtained in storage tank 1. Although not shown in the drawing, storage tank 1 is hot oil traced to maintain the sodium in the liquid state. The liquid or molten sodium is metered to reactor 5 by displacing an equivalent volume of sodium in tank 1 with a hydrocarbon oil such as mineral oil. The latter is obtained from storage tank 6, and is metered to sodium storage tank 1, under nitrogen pressure, through control valve 8 in line 7. During batch fill-up of sodium storage tank 1, the mineral oil flows back to vessel 5 via line 9.

Sodium is removed from storage tank 1, which operates liquid full, via a dip pipe 10 (dotted line) and flows to reactor 5 via line 11 which is hot oil jacketed (not shown). The isopropanol and n-heptane mixture, which has been dried to less than 50 p.p.m. water, is heated by hot oil in heat exchanger 12 to a temperature of about 160° to 210° F. and is passed to reactor 5 via line 13. The temperature at the exit end of exchanger 12 is the primary temperature control for reactor 5. Hot oil tracing (not shown) on reactor 5 acts merely as a trim temperature control.

The flow in line 7 is maintained at a set ratio to the flow in line 13 by a flow ratio controlling instrument, as will be described below. This control system insures a constant composition of sodium isopropylate in the effluent of reactor 5. The reaction mixture in reactor 5 is mixed vigorously by means of agitator 14. The vigorous agitation disperses the liquid sodium into small particles which react efficiently with isopropanol in the system. Hydrogen gas is evolved during the reaction and is vented overhead along with vapors from the system through line 15. The gases are passed to an air-cooled exchanger 16 where the vapors are condensed. Condensed vapors and hydrogen are separated in knockout drum 17. The condensed vapors are returned to reactor 5 via line 18, and hydrogen is vented to a flare via line 19.

Reactor 5 is maintained at a pressure within the range of about 70 to 90 p.s.i.g. and at a temperature of about 210° to 240° F. Sodium isopropylate dissolved in the composition overflows from reactor 5 to an intermediate storage vessel or zone designated as surge tank 21 via line 20. The overflow nozzle in reactor 5 is surrounded by a quieting well (not shown). The vigorous agitation in reactor 5 results in a uniform suspension of particles in the reaction mixture. This could allow particulate sodium to leave the reactor before being reacted. To minimize this tendency, the quieting well provides a volume of still liquid in the vicinity of the overflow nozzle. Consequently, relatively large particles will be settled out of the still liquid zone before having an opportunity to overflow into surge tank 21.

Surge tank 21 has two chambers separated by a weir 22. The reaction product mixture ovreflows from reactor 5 into the first chamber 23 where any particulate sodium or undissolved impurities greater than a few microns in diameter settle out of the liquid. The linear velocity in this chamber is quite low due to the large cross section of tank 21. Hot oil tracing (not shown) can be used to maintain the surge tank at a desired temperature, for example, 210° to 220° F. Tiny sodium particles may, however, continue to react in this chamber and, therefore, vent line 24 is connected to vent line 15 to remove any evolved hydrogen. A bootleg section 25 and drain 26 is provided in chamber 23 so that any unreacted impurities can be periodically removed. The neutralization composition overflows weir 22 into the second chamber 27, which acts as a surge for the process. The resulting neutralization composition is recovered via line 28 and passed directly to the step (vessel 30) comprising the neutralization of contaminated deashing liquid recovered from the aforementioned deashing treatment. The foregoing preparation of the neutralization composition can be carried out continuously in conjunction with a continuous neutralization step involving contaminated deashing liquid from an alpha-olefin polymer plant.

The following example will also serve to illustrate the novel process for preparing the neutralization compositions of this invention.

*Example 2*

In the present example, one drum of solid cast sodium was unloaded into the sodium drum 2. The electric band heater temperature controller was set at 240° F. and in about two to three hours the drum contents had reached a temperature of 225° F. and the sodium was in the liquid state. A positive pressure of 1 p.s.i.g. was maintained on the drum with nitrogen. Prior to melting the sodium, the sodium storage tank 1 had been filled with oil and heated to 230° F. by means of hot oil tracing on the vessel. The metering oil storage vessel 6 level was low and the vessel ready to accept displaced oil from the sodium storage tank. When the sodium temperature had reached 225° F., the sodium was allowed to flow by gravity to sodium storage tank. The transfer line 3 was jacketed with hot oil at a flowing temperature of about 270° F. Temperature in the sodium storage tank was maintained at 230° to 235° F. by the hot oil tracing. Inlet temperature of the tracing oil was 270° F. After the filling operation had been completed, the pressure in the oil storage tank, which had been atmospheric pressure, was revised to 80 p.s.i.g.

The sodium isopropylate reactor 5 was filled with solvent containing 55% isopropanol and 45% heptane and the mixture brought to 225° F. by passing it through the feed heat exchanger 12. The temperature in the reactor was maintained by hot oil tracing. Pressure in the reactor was maintained at 65 p.s.i.g. by a nitrogen blanket. Contents of the tank were agitated vigorously.

At this time oil from vessel 6 was passed to the sodium storage tank 1 at a slow rate. The oil displaced liquid sodium from this tank to the reactor 5 via the oil jacketed line 11. A few minutes after sodium began to flow into the reactor, hydrogen flow from the overhead condenser was observed, indicating that a reaction was taking place. The concentration of sodium isopropylate was allowed to build up for a few minutes and the flow of fresh isopropanol-heptane to the reactor 5 was started. After lining out on manual control, the ratio flow controller 43 on the isopropanol-heptane line 13 was set to automatically control the metering oil flow via flow controller 44 and maintained a constant sodium isopropylate concentration of 5% in the reactor effluent (line 20). Temperature in the reactor was controlled at 230° F. by controlling the isopropanol-heptane temperature at 180° to 190° F. Vapor leaving the reactor 5 through the vent (line 15) was about 58% solvent and 42% hydrogen, essentially all the nitrogen having been vented out of the reactor shortly after startup. Condensing temperature was about 85° to 90° F. in unit 16, so only about 2.5% of the vented hydrogen stream consisted of other vapors, thus contributing only a minimum loss to the system. Condensed vapors were returned to the reactor.

The 5% solution of sodium isopropylate dissolved in isopropanol-heptane overflowed from the reactor 5 through the quieting well to the surge vessel 21. Pressure in this vessel was maintained at 65 p.s.i.g. or reactor 5 pressure since the two vent lines were tied together. Surge vessel temperature was maintained at 190° to 210° F. Sodium isopropylate solution was drawn from this tank as required by the process. Changes in level in the surge vessel were detected by level controller 42 and this instrument reset the flow controller 43 on the fresh isopropanol-heptane line as required. Changes in flow in the isopropanol-heptane line were transmitted through the ratio flow controller 44 to instantaneously change the metering oil flow, and thus the sodium flow, thereby always maintaining a constant sodium isopropylate concentration.

It will be noted that the sodium is contacted in reactor 5 with a large excess of alcohol so that a final solution of sodium isopropylate is prepared at the desired concentration.

As will be noted from Example 2, another feature of this invention consists in the provision of an automatic control system and apparatus which is employed in conjunction with neutralization step and the neutralization composition preparation step to facilitate the flow of materials as well as to control the production of the sodium isopropylate. Referring again to the accompanying drawing for a better explanation of this feature, the neutralization composition is withdrawn from surge tank 21 via line 28 and passed to neutralization vessel 30 where it contacts a deashing liquid containing acidic impurities. The latter is fed to neutralization vessel 30 via line 31, and the resulting neutralized solvent mixture is withdrawn from the agitated and fully back mixed vessel 30 via line 32 and recycled to the solvent recovery area.

As illustrated, the pH of the neutralized solvent mixture stream in line 32 is continuously analyzed by a pH recorder controller 40 which is operatively connected to flow controller 41 (dotted lines are used in the drawing to indicate the various control instrument tie-ups). If the pH of the solvent stream in line 32 is less than 7, flow controller 41, responsive to the pH reading, automatically opens the control valves on line 28, thereby permitting an increased flow of the neutralization mixture from surge tank 21. Conversely, if the pH of the neutralized solvent mixture in line 32 is greater than desired, e.g. more than about 9, the flow of the neutralization mixture via line 28 is reduced to avoid the use of excess neutralizing agent. The above described automatic control system has the further advantage of permitting the production of the neutralization mixture to be directly related to its consumption in the neutralization step. Flow control instruments and recorders as well as pH meters, etc. all as illustrated in the drawing are commercial components and the various types, etc. and their specific functions will not be discussed herein, except where they perform a specific function.

Surge tank 21 is provided with a liquid level recorder controller 42, which measures the level of the neutralizing liquid mixture in the storage portion 27. When the level becomes lower as a result of the withdrawal of the neutralization mixture via line 28, the flow recorder controller 43, which is operatively connected to liquid level recorder controller 42, is reset and the flow of the isopropanol and hydrocarbon to reactor 5 is increased. At the same time, ratio flow recorder controller 44 is reset to increase the flow of oil to sodium storage vessel 1, which in turn increases the flow of the sodium reactant to reactor 5. Consequently, with increased feeding of the reactants, sodium isopropylate production is raised to ensure an adequate supply of the neutralization mixture in surge tank 21.

The above description of the control system illustrates automatic control of the various fluid flows with all of the attendant advantages of operation according to such automatic means. Although the major proportion of the neutralization mixture withdrawn from surge tank 21 is directed to neutralization vessel 30 as illustrated above, it is possible to use part of the mixture for treating vent gases, scrubbing solvents and the like whenever it is deemed necessary to neutralize acidic impurities.

The foregoing demonstrates the essential aspects of the process and apparatus employed for the preparation of the neutralization composition of this invention. As previously indicated, the process may be carried out with alkali metals other than sodium as well as with other hydroxyl-containing compounds and hydrocarbons. It will also be obvious that various modifications can be made with respect to the above described equipment and operating conditions and still produce the neutralization compositions of the present invention.

Since a number of different embodiments of the invention could obviously be carried out, it is to be understood that the invention is not limited by the specific examples set forth above. The term "alkoxide" as used in the above description of the invention as well as in the appended claims shall mean organic compounds in which the hydrogen atom of the hydroxyl group is replaced by a metal.

What is claimed is:

1. A substantially anhydrous method for neutralizing a contaminated deashing liquid consisting essentially of an aliphatic alcohol containing from 1 to 10 carbon atoms, a low molecular weight aliphatic hydrocarbon containing from 4 to 10 carbon atoms and acidic substances which consists essentially of the step of treating said deashing liquid with an amount of a neutralization composition which is at least sufficient to effect neutralization, said amount being from about 0.1 to 5.0% by weight based on the deashing liquid, said neutralization composition consisting essentially of an alkali metal alkoxide of an aliphatic alcohol containing from 1 to 10 carbon atoms, an aliphatic alcohol containing from 1 to 10 carbon atoms and a low molecular weight aliphatic hydrocarbon containing from 4 to 10 carbon atoms.

2. The method of claim 1 wherein the alcohol and the hydrocarbons in both the deashing liquid and the neutralization composition are the same.

3. The method of claim 1 wherein said alkali metal alkoxide is sodium isopropylate.

4. The method of claim 1 wherein both alcohols are isopropanol.

5. The method of claim 1 wherein both hydrocarbons are n-heptane.

6. The method of claim 1 wherein both hydrocarbons are n-hexane.

7. A substantially anhydrous method for continuously neutralizing a contaminated deashing liquid consisting essentially of an aliphatic alcohol containing from 1 to 10 carbon atoms, a low molecular weight aliphatic hydrocarbon containing from 4 to 10 carbon atoms and acidic substances which comprises essentially the steps of (a) feeding a molten alkali metal and a separate stream consisting essentially of a mixture of an aliphatic alcohol containing from 1 to 10 carbon atoms and a low molecular weight aliphatic hydrocarbon containing from 4 to 10 carbon atoms to a reaction zone to produce a neutralization mixture consisting essentially of from 2 to 10% by weight of said alkali metal alkoxide and the remainder of a mixture of alcohol and low molecular weight hydrocarbon, (b) continuously passing the thus formed neutralization mixture to an intermediate storage zone, (c) continuously regulating the flow rate of said molten alkali metal and the separate stream of said alcohol and hydrocarbon to the reaction zone of step (a) in response to the level of the neutralization mixture in said intermediate storage zone of step (b), (d) continuously withdrawing the neutralization mixture in an amount of from about 0.1 to 5.0% by weight based on the deashing liquid from said intermediate storage zone of step (b) for treatment of the contaminated deashing liquid in a neutralization zone, and (e) continuously recovering a neutralized liquid mixture from the neutralization zone of step (d), and (f) continuously measuring the pH of the recovered neutralized solvent mixture, and regulating the flow of neutralization mixture from the intermediate storage zone of step (b) to the neutralization zone of step (d) to maintain a pH of about 7 to 9.

8. The method of claim 7 wherein the alkali metal is sodium.

9. In combination, apparatus for neutralizing a contamniated deashing liquid containing acidic substances consisting essentially of conduit means for introducing a molten alkali metal stream and a stream of an aliphatic alcohol-aliphatic hydrocarbon mixture, said aliphatic alcohol containing from 1 to 10 carbon atoms and said aliphatic hydrocarbon containing from 4 to 10 carbon atoms, to a reaction zone, conduit means for withdrawing a neutralization mixture from said zone consisting essentially of a minor proportion of an alkali metal alkoxide of an aliphatic alcohol containing from 1 to 10 carbon atoms, and a major proportion of said alcohol-hydrocarbon mixture, conduit means for transferring said neutralization mixture to an intermediate storage zone, a flow controller for regulating the flow rates of said molten alkali metal and said alcohol-hydrocarbon stream to the reaction zone, said flow controller being responsive to a level indicator in said intermediate storage zone, conduit means for withdrawing said neutralization mixture from said intermediate storage zone to contact a contaminated deashing liquid in a neutralization zone, conduit means for withdrawing a neutralized liquid mixture from said neutralization zone, a pH controller for recording the pH of the withdrawn liquid mixture and a flow controller for regulating the flow of neutralization mixture from said intermediate storage zone to said neutralization zone in response to a predetermined pH range in said neutralized liquid mixture.

References Cited

UNITED STATES PATENTS

| | | | |
|---|---|---|---|
| 2,899,413 | 8/1959 | Hagemeyer et al. | 260—94.9 |
| 2,900,373 | 8/1959 | Martin | 260—94.9 |
| 2,910,461 | 10/1959 | Nowlin et al. | 260—94.9 |
| 3,082,199 | 3/1963 | Lattenkamp et al. | 260—94.9 |
| 3,216,925 | 9/1963 | Fanning et al. | 208—273 |

FOREIGN PATENTS

| | | |
|---|---|---|
| 629,184 | 9/1949 | Great Britain. |
| 727,923 | 4/1955 | Great Britain. |

LEON D. ROSDOL, *Primary Examiner.*

ALBERT T. MEYERS, SAMUEL H. BLECH,
*Examiners.*

M. WEINBLATT, S. D. SCHWARTZ,
*Assistant Examiners.*